(12) United States Patent
Nelson (10) Patent No.: US 6,311,434 B1
(45) Date of Patent: Nov. 6, 2001

(54) MOBILE AIRCRAFT HANGAR

(76) Inventor: Michael S. Nelson, 9180 Eddie and Park Rd., St Louis, MO (US) 63123

( * ) Notice: Subject to any disclaimer, the term of this patent is extended or adjusted under 35 U.S.C. 154(b) by 0 days.

(21) Appl. No.: 09/475,347

(22) Filed: Dec. 30, 1999

Related U.S. Application Data
(60) Provisional application No. 60/152,018, filed on Sep. 1, 1999.

(51) Int. Cl.[7] ..................................................... B62D 39/00
(52) U.S. Cl. ................................... 52/143; 52/64; 52/66; 52/DIG. 14; 296/26.04; 296/26.05
(58) Field of Search ................................ 52/64, 66, 117, 52/123.1, 143, DIG. 14; 296/26.04, 26.05

(56) References Cited

U.S. PATENT DOCUMENTS

| | | |
|---|---|---|
| D. 274,157 | 6/1984 | Freeland . |
| 2,744,581 | * 5/1956 | Cooper ................. 180/253 |
| 3,034,307 | * 5/1962 | Haines, Jr. ............... 52/64 |
| 3,519,306 | * 7/1970 | Young ................... 296/171 |
| 3,674,305 | * 7/1972 | Steury ................... 296/156 |
| 3,708,200 | * 1/1973 | Richards ................ 296/173 |
| 3,739,537 | * 6/1973 | Barnes .................... 52/64 |
| 3,818,652 | * 6/1974 | Pierce ............... 52/DIG. 14 |
| 3,838,879 | * 10/1974 | Lilly ..................... 296/1 R |
| 3,940,892 | 3/1976 | Lindbergh . |
| 3,981,464 | * 9/1976 | Dudley ................. 52/64 X |
| 4,004,382 | * 1/1977 | Carlson ................... 52/64 |
| 4,008,730 | 2/1977 | Keklak et al. . |
| 4,542,759 | 9/1985 | Kyner, Jr. . |
| 4,557,284 | 12/1985 | Bray . |
| 5,363,940 | 11/1994 | Fahrion . |
| 5,423,396 | 6/1995 | Fahrion . |
| 5,701,704 | 12/1997 | Landes . |

* cited by examiner

Primary Examiner—Beth A. Stephan
Assistant Examiner—Brian E. Glessner
(74) Attorney, Agent, or Firm—Dean A. Craine (57) ABSTRACT

A mobile aircraft hangar designed to provide a temporary enclosed working environment for workers performing aircraft maintenance, evaluation and support. The hangar includes a mobile housing assembly designed to enclose a section of the wing or fuselage of an aircraft. The housing assembly is assembled over a chassis with four wheels and steering mechanism that enables the housing assembly to be easily driven around an aircraft. The housing assembly includes one end wall and two vertical side walls, forming a three-sided enclosing structure. Formed on the housing assembly opposite the end wall is a main opening through which a section of the fuselage or wing may extend. The housing assembly also includes moveable floor panels that can be arranged in different configurations for working on different sections of the aircraft. Optional lift actuators are provided which enable the housing assembly to be raised or lowered. Disposed over the housing assembly is a roof assembly that, in one embodiment, can be selectively raised or lowered to closely cover a section of the aircraft placed inside the housing assembly. Formed on the two side walls are two recessed openings through which a section of the wing or horizontal stabilizer may extend. An optional door, curtains, and slide panels are provided over the main opening and the recessed side openings, respectively, to provide a relatively closed structure.

20 Claims, 5 Drawing Sheets

MOBILE AIRCRAFT HANGAR

This is a utility patent application based on the provisional patent application (Ser. No. 60/152,018) filed on Sep. 1, 1999.

BACKGROUND OF THE INVENTION

1. Field of the Invention

This invention relates to aircraft hangars and, more particularly, to hangars that are mobile and adjustable for accommodating different aircraft.

2. Description of the Related Art

Additional aircraft hangars and work docks are commonly desired by most aircraft operators and airport authorities. Unfortunately, the construction costs for new hangars and the amount of available space around an airport often prevents their construction. Furthermore, the availability of hangars is a factor that substantially affects the aircraft maintenance operations and aircraft scheduling for an airline company.

Airlines typically have two distinct maintenance operations modes—a line maintenance and a check maintenance mode—that perform both scheduled and non-routine maintenance actions. Because an aircraft is used daily, it needs to be in a continual state of serviceability. Each aircraft in the airline company's fleet is assigned a routing schedule. Once assigned, the smooth operation of the airline company depends on the aircraft being at the gate in a serviceable condition. If it is not, the schedule of the aircraft in the fleet can be affected. Typically, each aircraft operating in the fleet has scheduled maintenance tasks performed during regular overnight visits. The completion of these tasks is of utmost importance to the airline company. The performance of these maintenance tasks at night and during inclement weather conditions often slows down the production of the workers. As a result, the maintenance tasks on the aircraft may not be completed.

Line maintenance operations are driven by the airline company's schedule. Aircraft are assigned to routes dependant on the projected passenger capacity for a given time period or season. For a particular season, a narrow-body aircraft may be required while the next season may require a wide-body aircraft. Also, the number of aircraft at a location may change with different seasons. These two variables require maintenance to be carried out at different facilities at different times of the year. If there are inadequate or insufficient hangar facilities at an airport, the aircraft may need to be re-routed to an airport with adequate facilities so that the maintenance service may be completed.

Factors that make up non-routine maintenance include items that suddenly break or need repair in the normal course of operation. Some of these items can be deferred while some require immediate replacement or repair before the aircraft can be dispatched. Many of these items involve procedures that require many man-hours to complete. They also may require a significant level of disassembly, rework, and re-assembly which, ideally, should be completed at a maintenance base inside a hangar. In many instances, these repairs must be performed outside at airports without hangars.

In some instances, the aircraft may be in service with a particular component that is inoperative. Components operating under these programs, known as a MEL (minimum equipment list) or CDL (configuration deviation list) programs, have time restrictions that specifically limit how long the aircraft can operate in this condition. This puts the aircraft in a state known as "degraded serviceability." If the time limit expires and the condition has not been repaired, the aircraft is considered unserviceable.

The repair or replacement tasks for aircraft operating under MEL or CDL programs are assigned to a line station as the aircraft continues on its normal routing. In the early stages of the time restriction, lessor priority is usually given to those deferrals due to weather conditions or lack of hangar availability. As the deadline nears, the importance of performing these tasks increases. Often at the end of the deferral period, the aircraft is rerouted to a line maintenance base that has a hangar.

One of the factors in deciding to which line station a task will be assigned is whether or not the station has in stock the aircraft part that is inoperative. When the task is deferred due to weather or lack of hangar availability, utilization of the parts inventory is degraded. Many times when the aircraft is later re-routed to a line maintenance base for repair at the end of the deferral period, the local storage facility at the line station maintenance base may not have the particular part in stock. The problem of deferral may have occurred recently on other aircraft, and the part has not yet been restocked. This can lead to the situation where the aircraft is placed out of service, known as AOS. Had the previously assigned line maintenance stations been available with adequate facilities to change the part for which they were allocated, the aircraft would have been returned to the state of full air worthiness sooner.

For all of these reasons, availability or lack of adequate hangar facilities impacts an airline company's initial decision to provide air transportation to an airport. If the airport authorities can offer hangars to airlines, they can attract and maintain airline service. Also, if affordable hangars are available to an airline company, utilization of their fleets can be maximized.

What is needed is an aircraft hangar that is relatively inexpensive to purchase, adjustable for use with different sized aircraft, and moveable to different areas on the airport.

SUMMARY OF THE INVENTION

It is the object of the invention to provide a mobile aircraft hangar.

It is another object of the invention to provide such an aircraft hangar for workers performing routine and non-routine maintenance services on an aircraft.

It is a further object of the invention to provide such an aircraft hangar that is adaptable for working on different sized aircraft, and on different sections on the aircraft.

These and other objects are met by a mobile aircraft hangar, disclosed herein, designed to provide a temporary, enclosed working environment for workers performing a wide range of routine and non-routine maintenance services on an aircraft. The aircraft hangar includes a housing assembly designed to enclose various sections of a large aircraft including, but not limited to, the engines and pylon assemblies, various wing sections, the horizontal stabilizer and elevator assemblies, the nose and doors. The housing assembly includes one vertical end wall and two opposite vertical side walls connected together along their adjacent edges to form a three-sided enclosing structure. Located opposite the vertical end wall is large main opening, which allows a desired section of the aircraft to be positioned inside the central work area located inside the hangar assembly during use. A set of adjustable doors is placed over the main opening, which may be selectively opened or closed to create a closed work environment around the desired section of aircraft positioned inside the work area.

The housing assembly includes a plurality of moveable floor panels that can be arranged in different configurations inside the housing assembly for supporting workers working on different sections of the aircraft. The moveable floor panels also allow various aircraft components to be easily inserted or removed from the aircraft. The housing assembly may also include an optional housing assembly lifting means that enables the housing assembly to be selectively raised over the chassis described below, so that the housing assembly may be placed around an elevated section of an aircraft. Further, the housing assembly may include a rear door and exterior articulating stairs to provide ingress and egress from the housing assembly.

The housing assembly is attached to a rigid chassis. The chassis includes a plurality of wheels and a steering means that enable it to be easily maneuvered around an aircraft parked in the repair area. The chassis also includes an optional engine, electric generators, hydraulic pumps, and environmental controls to provide for the workers a self-sustained work environment.

Disposed above and extending over the housing assembly is a roof assembly design to fully cover the central work area. In the preferred embodiment, the roof assembly is supported by a roof lifting assembly that enables the roof assembly to be selectively raised and lowered over the housing assembly so that different sections of the aircraft may be placed inside the housing assembly. The roof lifting assembly includes two vertically aligned, rear jack screws located near the two rear corners and two vertically aligned, front jack screws located aft of the mid-line axis of the housing and roof assembles. The jack screws are all coupled to at least one motor which is used to selectively raise and lower the roof assembly over the housing assembly.

The roof assembly is spaced apart from and disposed above the housing assembly, thereby creating an upper space therebetween. By positioning the front jack screws just aft of the mid-line axis of the housing and roof assemblies, the sections of the upper space, located on each opposite side wall that extends forward from the front jack screws to the main opening, are unobstructed. During use, a horizontally aligned section of an aircraft, such as a wing or the horizontal stabilizer, may be extended between the two unobstructed sections of the upper space and positioned transversely through the hangar assembly. In another embodiment, each side wall includes a recessed opening that extends downward from the unobstructed section of the upper space. Each recessed opening provides a larger open area for a wing or stabilizer to extend.

Located in the upper space between the roof assembly and the housing assembly and between the roof assembly and the adjustable doors, is an optional first sealing means designed to selectively close the upper space. The first sealing means is adjustable in length to accommodate different heights of the upper space. The first sealing means is also designed to conform to different shapes of sections of the aircraft placed therein. A second sealing means is also provided for each recessed opening to close off any gaps or openings created between the vertical side wall and the upper and lower surfaces of the wing or stabilizer extending through the recessed space. A third sealing means is provided along the top of the adjustable doors that extend upward to selectively close off any open space between the top of the doors and the lower surface of a wing or stabilizer extending through the main opening.

DESCRIPTION OF THE PREFERRED EMBODIMENT(S)

Figure 1:
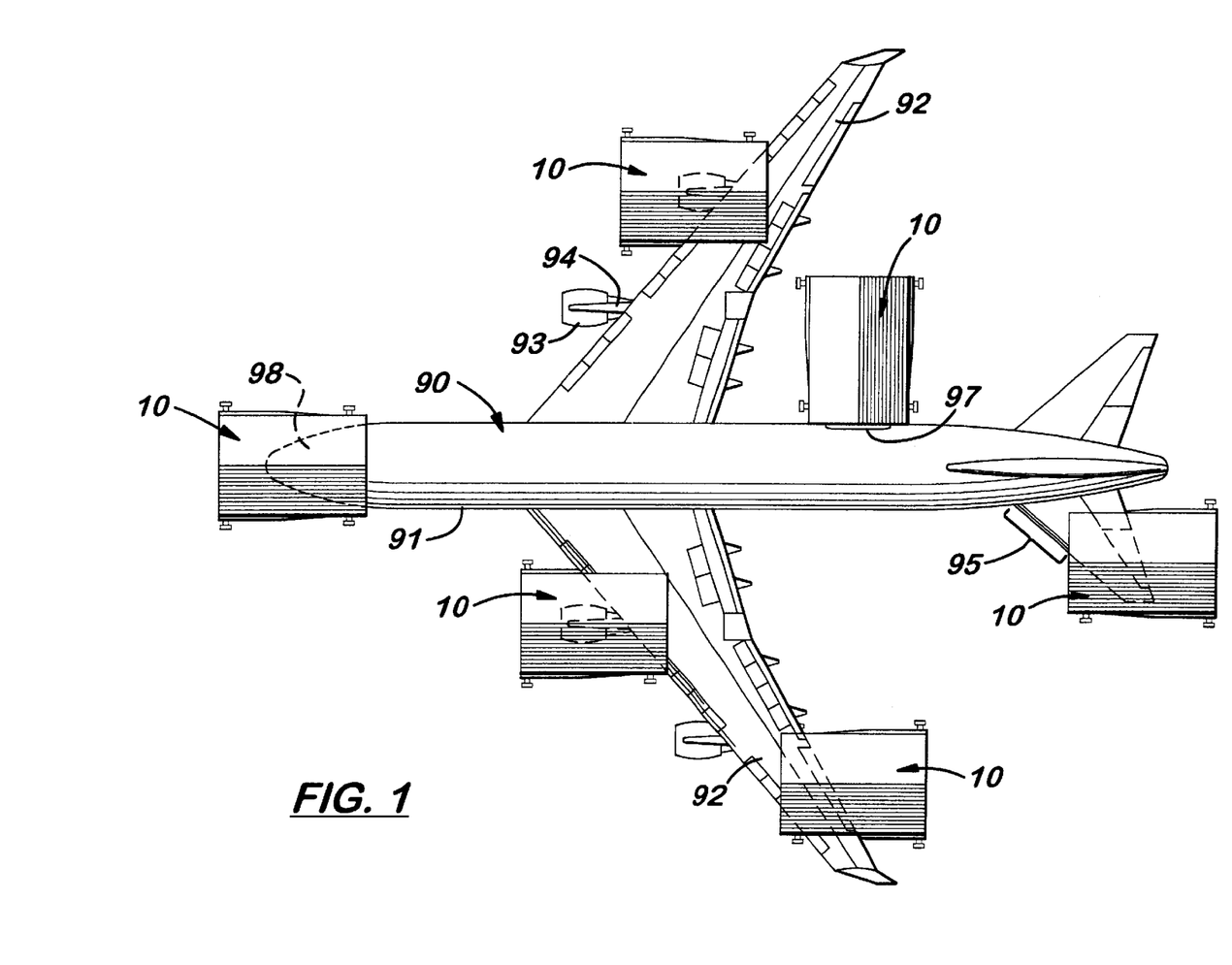
FIG. 1 is a top plan view of an aircraft illustrating the placement of the aircraft hangar around different sections of the aircraft.

Shown in FIGS. 1–9 is a mobile aircraft hangar 10 designed to provide a temporary, enclosed working environment for workers performing aircraft maintenance service. As shown in FIG. 1, the aircraft hangar 10 includes a housing assembly designed to enclose various sections of an aircraft 90 including, but not limited to, the fuselage 91, various sections of the wing 92, the engine 93, and pylon assembly 94, the horizontal stabilizer and elevator assembly (denoted generally as 95), the doors 97, and the nose 98.

Figure 2:
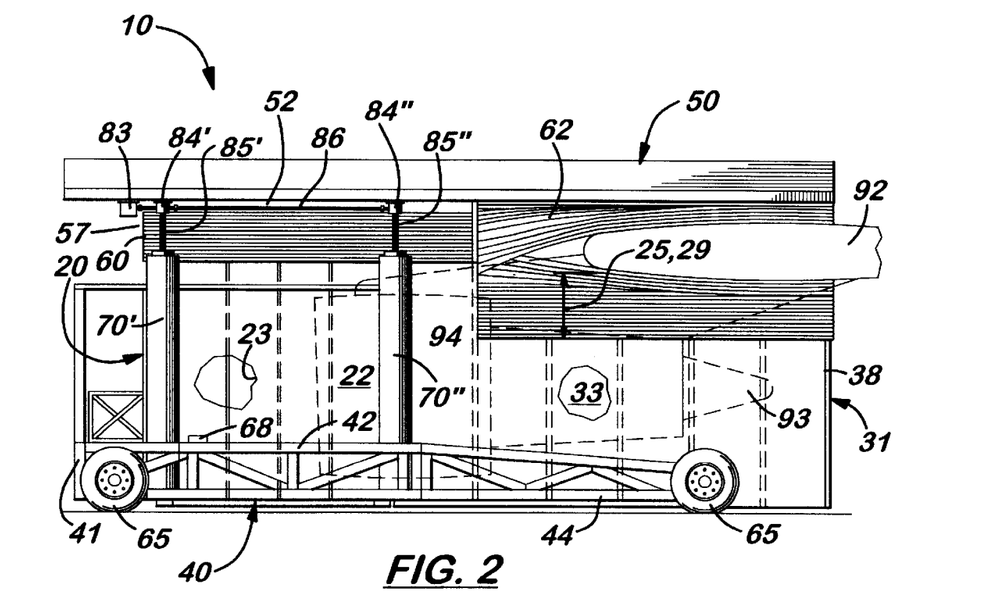
FIG. 2 is a side elevational view showing an engine pylon assembly and wing placed inside the aircraft hangar.

As shown in FIG. 2, the housing assembly 20 is attached to a chassis 40 that includes a plurality of wheels 65 that enable the hangar 10 to be easily maneuvered around an aircraft 90 parked in a repair area. A roof assembly 50 is disposed over the housing assembly 20 to provide a fully covered work area 33 for workers servicing the aircraft 90.

As shown in FIGS. 2–6, the housing assembly 20 includes one vertical end wall 21 and two opposite side walls 22, 27, joined together at the adjacent edges to form a partially enclosing three-sided structure. Located opposite the end wall 21 is a large main opening 31 that provides access to the central work area 33 located inside the housing assembly 20. The end wall 21 and side walls 22, 27 are made of square, metal tubular frame members (4"×3") covered with typical ⅛ inch thick metal siding material 23. Suitable connections are used to attach the corners of the end wall 21 and side walls 22, 27 together in a vertical, perpendicularly aligned position.

The chassis 40 is also a three-sided structure including one end frame member 41, two opposite side frame members 42, 43, and two forward extending front frame members 44, 45, respectively. The end frame member 41, the side frame members 42, 43 and front frame member 44, 45 have a relatively low profile and are made of steel square tubular material (3 inch × 3 inch). The adjacent ends of the end frame member 41, the side frame members 42, 43, and the front frame members 44, 45 are bolted together to form a rigid three-sided structure.

During assembly, the end wall 21 is vertically aligned within the end frame member 41. The two side walls 22, 27 are vertically aligned within the side frame members 42, 43, respectively. A floor panel 30, shown in FIG. 7, is placed over the exterior portion of the end frame member 41, thereby creating a support surface for the exterior articulating stairs 28.

In the preferred embodiment, two pairs of independent steering wheels 65 are attached to the chassis 40, that enable the chassis 40 to move in a "track-like", "pirouette like", or a "crab-like" motion around an aircraft 90. Each steering wheel 65 extends laterally from the adjacent side frame member 42, 43, or front frame member 44, 45 and includes a steering mechanism 66. Each steering mechanism 66 includes a receiver 67 that is controlled remotely by a steering transmitter 68 (FIG. 4) located on the housing assembly 20. During use, steering directions are sent from the steering transmitter 68 to each receiver 67 to control the direction of travel for the hangar 10. In the embodiment shown herein, the hangar 10 is designed to be pulled or pushed by a tractor into position around an aircraft 90 (not shown). It should be understood, however, that the hangar 10 may include an engine 14 located in an engine compartment 15 (FIG. 5) that is coupled to the steering wheels 65.

Figure 6:
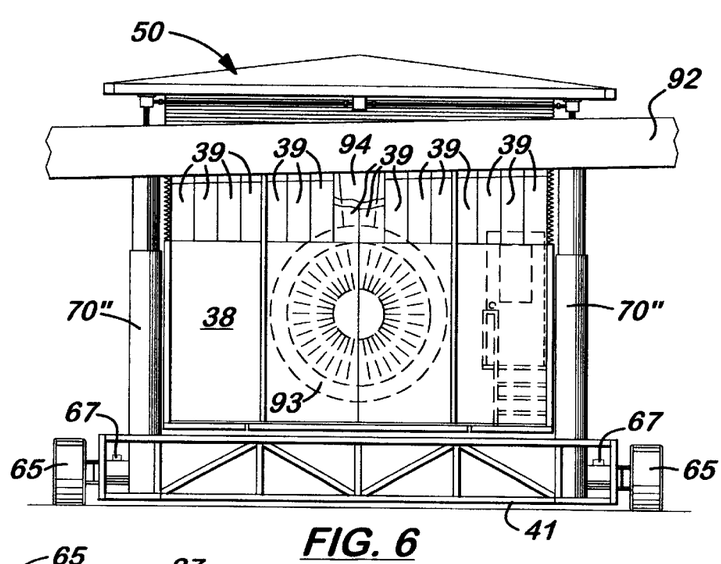
FIG. 6 is a front elevational view of the aircraft hangar shown in FIG. 5.
Figure 7:
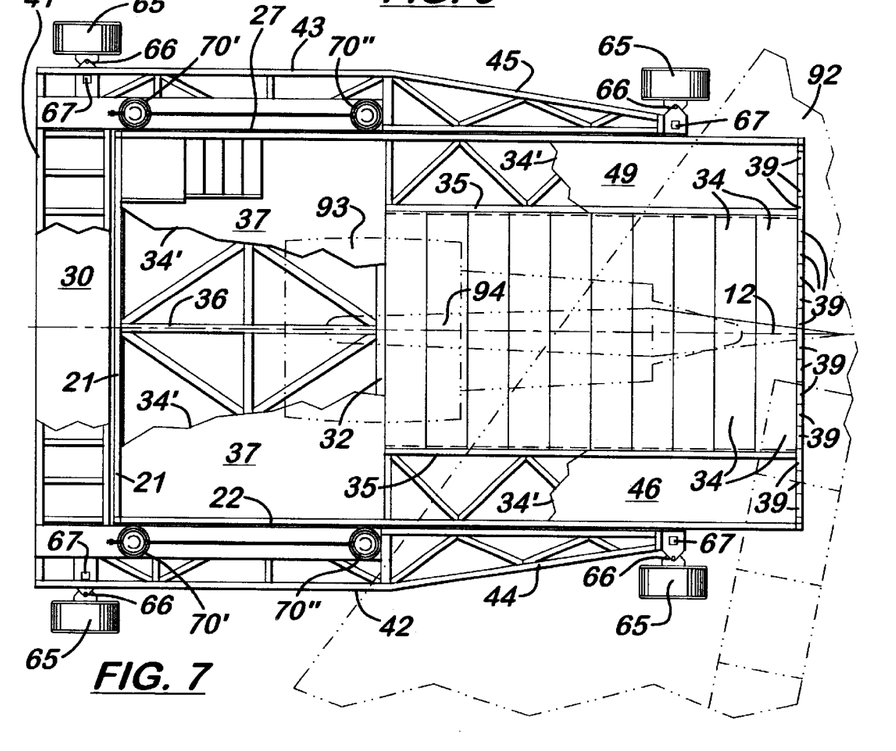
FIG. 7 is a top plan view of the aircraft hangar.

As shown more clearly in FIGS. 6 and 7, located inside the housing assembly 20 is a plurality of adjustable floor panels 34 that can be repositioned inside the housing assembly 20 to create alternative work support areas. The floor panels 34 are supported by two side beams 35 aligned longitudinally inside the housing assembly 20. Located longitudinally along the central axis 12 of the housing assembly 20 is a center beam 36 that is connected at its opposite ends to the end wall 21, and to a transverse floor support beam 32. The floor panels 34 are aligned transversely in side the housing assembly 20 with one end supported by one side floor beam 35 and the opposite end supported by the opposite side floor beam 35. During use, the floor panels 34 can be selectively moved to provide different work support area configurations and provide access for removing or installing components on the aircraft 90. The rear section 37 and the two lateral sections 48, 49 of the work area 33 are covered with fixed flooring material 34'.

In the preferred embodiment, the housing assembly 20 includes a housing assembly lifting means that enables the housing assembly 20 to be selectively raised over the chassis 40 so that an elevated section of the aircraft 90 may be placed inside the housing assembly 20. Raising, the housing assembly 20 also enables the floor panels 34 to be elevated to a desired height for working on elevated sections of the aircraft 90. The housing assembly lifting means includes two corner lift actuators 70' located at the rear corners of the housing assembly 20, and two central lift actuators 70" located just aft of the transverse mid-line axis 12 of the housing assembly 20.

Figure 8:
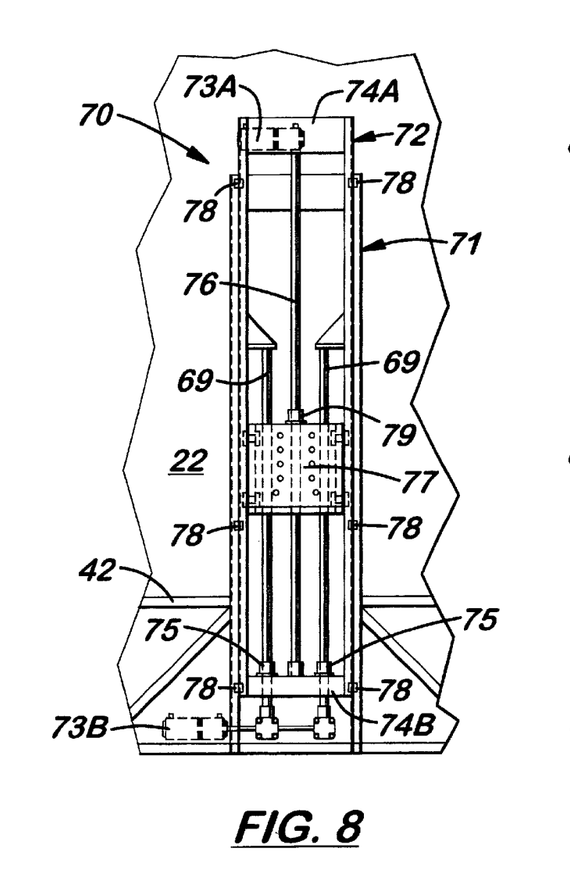
FIG. 8 is a sectional side elevational view of a lift actuator.

As shown in FIG. 8, each lift actuator 70', 70" includes a vertically aligned, fixed rectangular-shaped outer track 71 attached at its lower end to the chassis 40. The outer track 71 is an elongated structure, c-shaped in cross-section. Disposed longitudinally inside the outer track 71 is a moveable, rectangular-shaped inner mast 72. The inner mast 72 is also an elongated structure, c-shaped in cross-section, that is slightly smaller than the outer track 71 and includes an upper base plate 74a and a lower base plate 74b attached to its opposite ends. Located longitudinally inside the inner mast 72 is a central jack screw 76. The upper end of the central jack screw 76 is attached to a gear box 83 that is coupled to a first motor 73a attached to the upper mast base plate 74a. Disposed between the outer track 71 and the inner mast 72 are a plurality of guide rollers 78 that enable the inner mast 72 to move longitudinally inside the outer track 71.

Located inside the inner mast 72 is a vertically moving trolley 77 that is attached securely to the side wall 22 of the housing assembly 20. Attached centrally to the trolley 77 is a threaded nut 79 that interconnects with the center jack screw 76. When the center jack screw 76 is rotated, the trolley 77 moves longitudinally over the center jack screw 76 and inside the inner mast 72.

Attached to the chassis 40 is a second motor 73b coupled to a pair of gear boxes 83 located inside the outer track 71 and below the inner mast 72. Attached to each gear box 83 is a vertically aligned jack screw 69 that extends freely through the trolley 77, and is supported at its upper end by an inward extending block located inside the outer track 71. Attached to the lower base plate 74b are two traveling nuts 75, which interconnect with the jack screws 69. When the second motor 73b turns the two jack screws 69, the inner mast 72 moves longitudinally inside the outer track 71.

During operation, the first and second motors 73a, 73b are operated separately to raise or lower the housing assembly 20 over the chassis 40 in two stages.

Figure 3:
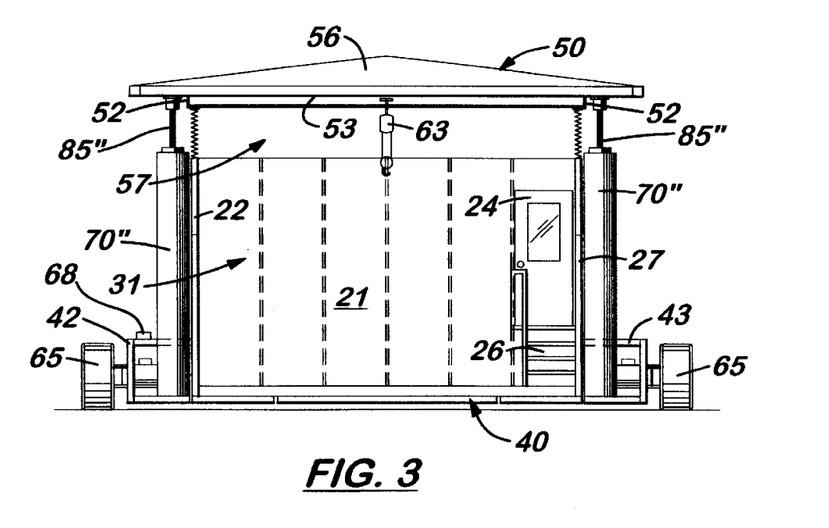
FIG. 3 is a front elevational view of the aircraft hangar with the first sealing means and the door panels removed and the housing and roof assemblies in retracted positions.

Disposed over the housing assembly 20 is a rigid roof assembly 50, shown in FIG. 3, designed to fully cover the housing assembly 20. The roof assembly 50 includes two parallel outer beams 52, a plurality of joists 53 (one shown) that extend transversely between the two beams 52, and a plurality of cross members (not shown) that extend between the joists 53. The beams 52, joists 53 and cross-members are welded together to form a rigid structure. Suitable roofing material 56 is then placed over the rigid structure to create a waterproof enclosure.

Figure 9:
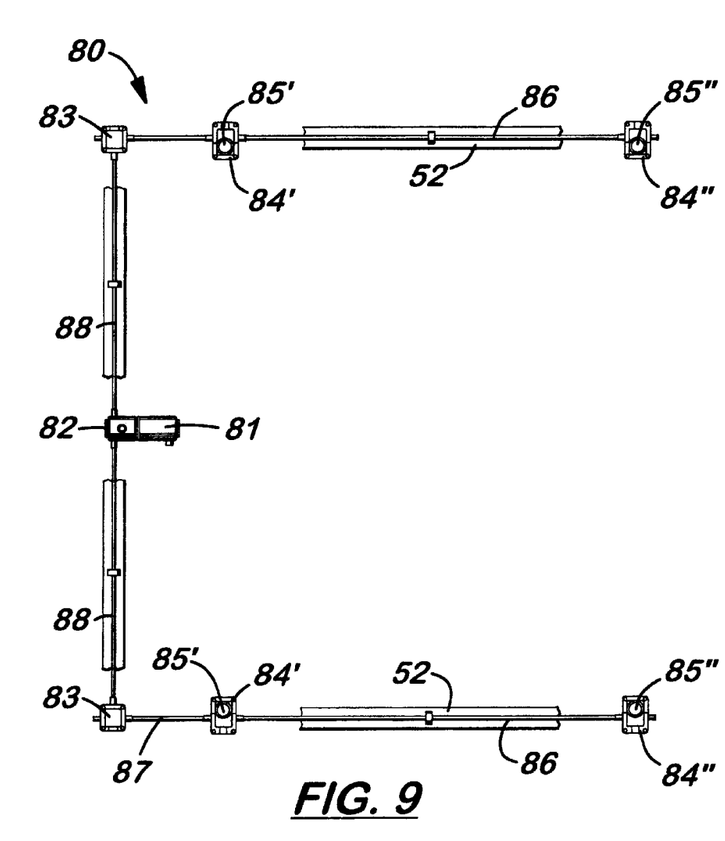
FIG. 9 is a top plan view of the roof assembly jack system.

In the preferred embodiment shown in FIG. 9, the roof assembly 50 is supported by a roof lifting assembly 80 that enables the roof assembly 50 to be selectively raised and lowered over the housing assembly 20, so that different sections of the aircraft 90 may be placed inside the housing assembly 20. The roof lifting assembly 80 includes two vertically aligned jack screws 85' located near the two rear corners and two vertically aligned, front jack screws 85" located aft of the transverse mid-line axis 12 of the housing assembly 20. The two pairs of jack screws 85', 85" are all coupled to a motor 81 that is used to selectively raise and lower the roof assembly 50 over the housing assembly 20.

The roof lifting assembly 80 is located on the bottom surface of the two outer beams 52 on the roof assembly 50. As shown more clearly in FIG. 9, the front jack screw 85" is connected at its upper end to a front gear actuator 84" connected to the adjacent outer beam 52. Each front gear actuator 84" is connected to a long first drive shaft 86 that extends rearward along the outer beam 52 and connects to a rear gear actuator 84'. A short second drive shaft 87 connects each rear gear actuator 84' to a corner gear box 83 located at the rear corner of the roof assembly 50. A third long drive shaft 88 extends along the bottom surface of the end joist 53 and connects to a transmission 82. The transmission 82 is connected to a motor 81. During operation, the motor 81 is activated to rotate in a desired direction to rotate the jack screws 85', 85" to evenly raise or lower the roof assembly 50. It should be understood that the roof lifting assembly 80 could be replaced by a fixed roof support assembly that uses rigid posts in place of the jack screws 85' and 85", thereby making the roof assembly 50 permanently fixed in position over the housing assembly 20.

As mentioned above, a main opening 31 is formed on the end of the hangar 10 opposite the end wall 21. As shown in FIG. 6, a plurality of door panels 38 are disposed vertically over the main opening 31, which may be selectively opened or closed to create a closed work environment around the desired section of aircraft placed in the work area 33. In the preferred embodiment, the door panels 38 are made of steel metal or aluminum, and are connected together along their adjacent surfaces by removable hinge pins (not shown).

As shown in FIGS. 2 and 3, the roof assembly 50 is spaced above the housing assembly 20 with an open upper space 57 created above the end wall 21, the two side walls 22, 27, and the door panels 38. Disposed inside the upper space 57 located above the end wall 21, and above the sections of each side wall 22, 27, and aft of the front lift actuator 70 " is a vertically adjustable curtain 60, which extends downward from the rear joist 53 and the outer beams 52 on the roof assembly 50. The curtain 60 is U-shaped and adjustable in length to close off different heights of the upper space 57 when the roof assembly 50 is raised or lowered.

Figure 4:
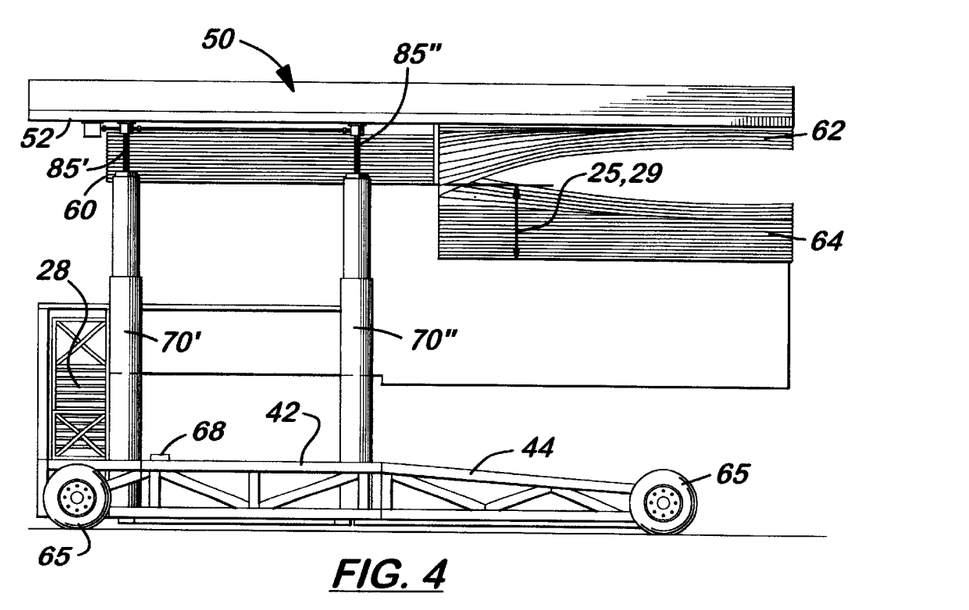
FIG. 4 is a side elevational view showing the housing assembly in an elevated position.
Figure 5:
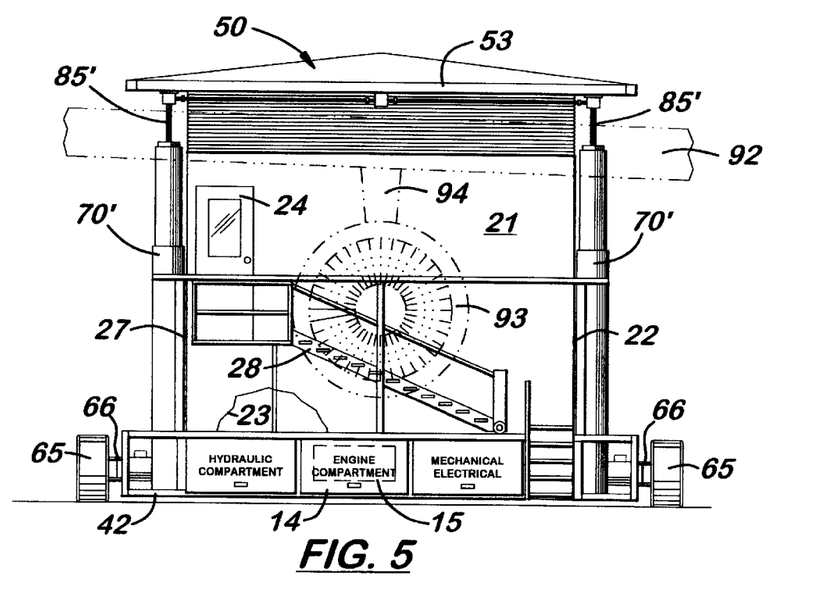
FIG. 5 is a rear elevational view of the aircraft hangar shown in an elevated position.

As shown in FIGS. 2 and 4, each side wall 22, 27 includes an optional recessed opening 25, 29, respectively, that extends downward from the upper space 57 to approximately the mid-longitudinal axis of the side walls 22, 27. Each recessed opening 25, 29 extends forward and terminates on the main opening 31 of the housing assembly 20. During use, the recessed openings 25, 29 allow a section of the wing 92 or fuselage 91 to be better accommodated by the hangar 10 when a desired section of the aircraft 90 is placed inside the work area 33 of the housing assembly 20.

Attached to the bottom surfaces of the outer beams 52 and located directly over the recessed openings 25, 29, and attached to the front joist 53' is a second flexible curtain 62. The second flexible curtain 62 is U-shaped and designed to extend downward and conform to the general shape of the section wing 92 and extends through the upper and recessed spaces 57, 25, 29, respectively, and the main opening 31. Attached to the upper surface of the side walls 22, 27 located directly below each recessed opening 25 and 29 is an adjustable upward extending lower compression seal 64. During use, the lower compression seal 64 is raised upward to conform to the lower surface of the wing 92 to close off any open recessed openings 25 or 29.

As shown in FIG. 6, located above each door 97 is a plurality of upward extending, adjustable slide panels 39 that may be selectively adjusted in height to close off the open spaces located between the top of the door panels 38 and the bottom of an object placed through the main opening 31 and the top of the door panels 38 and the roof assembly 50. In the preferred embodiment, the slide panels 39 are formed inside each door panel 38 and slide longitudinally from each door panel 38.

Also located under the roof assembly 50 and inside the work area 33 is an optional crane 63 capable of lifting various aircraft parts for maintenance or repair work. Further, the housing assembly 20 may include a rear door 24 and interior and exterior articulating stairs 26, 28, respectively, to provide ingress and egress from the housing assembly 20.

In the preferred embodiment, the hangar 10 measures 39'×31"×20' (L×W×H). The vertical end wall 21 measures approximately 22'×15' (L×H) while side walls 22, 27 measure approximately 35'×15' (L×H). The roof assembly 50 measures 40'×26' (L×W). Each of the four door panels 38 measures 8½'×5' (L×W). The recessed side openings 25 and 29 each measure approximately 18'×5' (L×H).

In compliance with the statute, the invention described herein has been described in language more or less specific as to structural features. It should be understood, however, that the invention is not limited to the specific features shown, since the means and construction shown, comprise only some of the preferred embodiments for putting the invention into effect. The invention is therefore claimed in any of its forms or modifications within the legitimate and valid scope of the amended claims, appropriately interpreted in accordance with the doctrine of equivalents.

What is claimed is:

1. A moveable aircraft hangar, comprising:
   a. a housing assembly having a vertical end wall and two opposite, vertical side walls, said end wall and said side walls being connected together at their adjacent edges to form a three-sided enclosure, said housing assembly having a main opening;
   b. a chassis attached to said housing assembly, said chassis having a plurality of wheels enabling said housing assembly to be moved over a surface;
   c. a roof assembly disposed over and covering said housing assembly, said roof assembly being sufficiently disposed above said housing assembly to create an unobstructed upper space located above the vertical sidewalls so that a section of an aircraft may extend through the upper space when a desired section of an aircraft is extended through said main opening and disposed inside said housing assembly.

2. A moveable aircraft hangar, as recited in claim 1, further including a vertically adjustable curtain located in said upper space between said roof assembly and said housing assembly, enabling said upper space to be selectively closed.

3. A moveable aircraft hangar, as recited in claim 1, further including a plurality of adjustable doors located over said main opening capable of being selectively opened and closed.

4. A moveable aircraft hangar, as recited in claim 1, further including a steering means enabling said chassis to be steered when moved.

5. A moveable aircraft hangar, as recited in claim 1, further including a plurality of moveable floor panels located inside said housing assembly.

6. A moveable aircraft hangar, comprising:
   a. a housing assembly having a vertical end wall and two opposite, vertical side walls, said end wall and said side walls being connected together at their adjacent edges to form an enclosure, said housing assembly having a main opening, each said side wall having a downward extending recessed opening, said recessed opening being located opposite each other thereby allowing a substantially horizontally aligned section of an aircraft to extend transversely across said housing assembly when a section of an aircraft is placed inside said housing assembly;
   b. a chassis attached to said housing assembly, said chassis having a plurality of wheels enabling said housing assembly to be moved over a surface; and,
   c. a roof assembly disposed over and covering said housing assembly, said roof assembly being sufficiently disposed above said housing assembly thereby creating an upper space through which a section of an aircraft may extend to enable a desired section of an aircraft to be placed inside the housing assembly.

7. A moveable aircraft hangar, as recited in claim 6, further including an adjustable sealing means located inside each said recessed opening enabling said recessed opening to be selectively closed.

8. A moveable aircraft hangar, as recited in claim 1, further including a housing assembly lifting means enabling said housing assembly to be selectively raised and lowered over said chassis.

9. A moveable aircraft hangar, as recited in claim 1, further including a roof assembly lifting means enabling said roof assembly to be selectively raised and lowered over said housing assembly.

10. A moveable aircraft hangar, comprising:
   a. a housing assembly having a vertical end wall and two opposite, vertical side walls, said walls being connected together at their adjacent edges to form an enclosure, said housing assembly having a main opening and central work area;
   b. a chassis attached to said housing assembly, said chassis having a plurality of wheels enabling said housing assembly to be moved over a surface;
   c. steering means on said chassis enabling said housing assembly to be driven to desired location on a surface;
   d. a roof assembly disposed over said housing assembly, said roof assembly being disposed above said housing assembly, thereby creating an upper space through which a section of an aircraft may extend when a section of an aircraft is placed in the central work area;
   e. a housing assembly lifting means enabling said housing assembly to be selectively raised and lowered over said chassis, and;
   f. a roof assembly lifting means enabling said roof assembly to be raised and lowered over said housing assembly.

11. A moveable aircraft hangar, as recited in claim 10, further including an adjustable sealing means located inside said upper space created between said roof assembly and said housing assembly.

12. A moveable aircraft hangar, as recited in claim 10, further including a plurality of adjustable door panels located over said main opening, said door panels capable of being selectively opened or closed.

13. A moveable aircraft hanger, as recited in claim 10, further including a plurality of removable floor panels disposed horizontally inside said housing assembly.

14. A moveable aircraft hangar, as recited in claim 10, further including each said side wall having a downward extending recessed opening located along the top edge of said side wall to allow a section of an aircraft to extend transversely over said housing assembly when a section of an aircraft is placed inside said housing assembly.

15. A moveable aircraft hangar, as recited in claim 14, further including a second adjustable sealing means located inside said recessed opening.

16. A moveable aircraft hangar, comprising:
   a. a housing assembly having a vertical end wall and two opposite, vertical side walls, said walls being connected together at their adjacent edges to form an enclosure, said housing assembly having a main opening and central work area;
   b. a chassis attached to said housing assembly, said chassis having a plurality of wheels enabling said housing assembly to be moved over a surface and a steering means enabling said housing assembly to be driven to desired locations on a surface;
   c. a roof assembly disposed over said housing assembly, said roof assembly being disposed above said housing assembly thereby creating an upper space through which a section of an aircraft may extend when a section of an aircraft is placed in the central work area;
   d. a housing assembly lifting means enabling said housing assembly to be selectively raised and lowered;
   e. a roof assembly lifting means-enabling said roof assembly to be raised and lowered over said housing assembly;
   f. an adjustable door located over said main opening, said door capable of being selectively closed around a section of aircraft placed into said hanger assembly, and;
   g. a plurality of movable floor panels disposed horizontally inside said housing assembly.

17. A moveable aircraft hangar, as recited in claim 16, further including each said side wall having a forward extending recessed opening located along the top edge of said side wall to allow a section of an aircraft to extend transversely over said housing assembly when a section of an aircraft is placed inside said housing assembly.

18. A moveable aircraft hangar, as recited in claim 17, further including an adjustable curtain located in said upper space located above said adjustable door.

19. A moveable aircraft hangar as recited in claim 18, further including a second adjustable curtain located in said upper space located above said adjustable door.

20. A moveable aircraft hangar as recited in claim 19, further including a compression seal located in each said recessed opening enabling said recessed opening to be selectively closed.

* * * * *